N. STARR.
Breech-Loading Fire-Arm.
No. 1,141. Patented May 3, 1839.
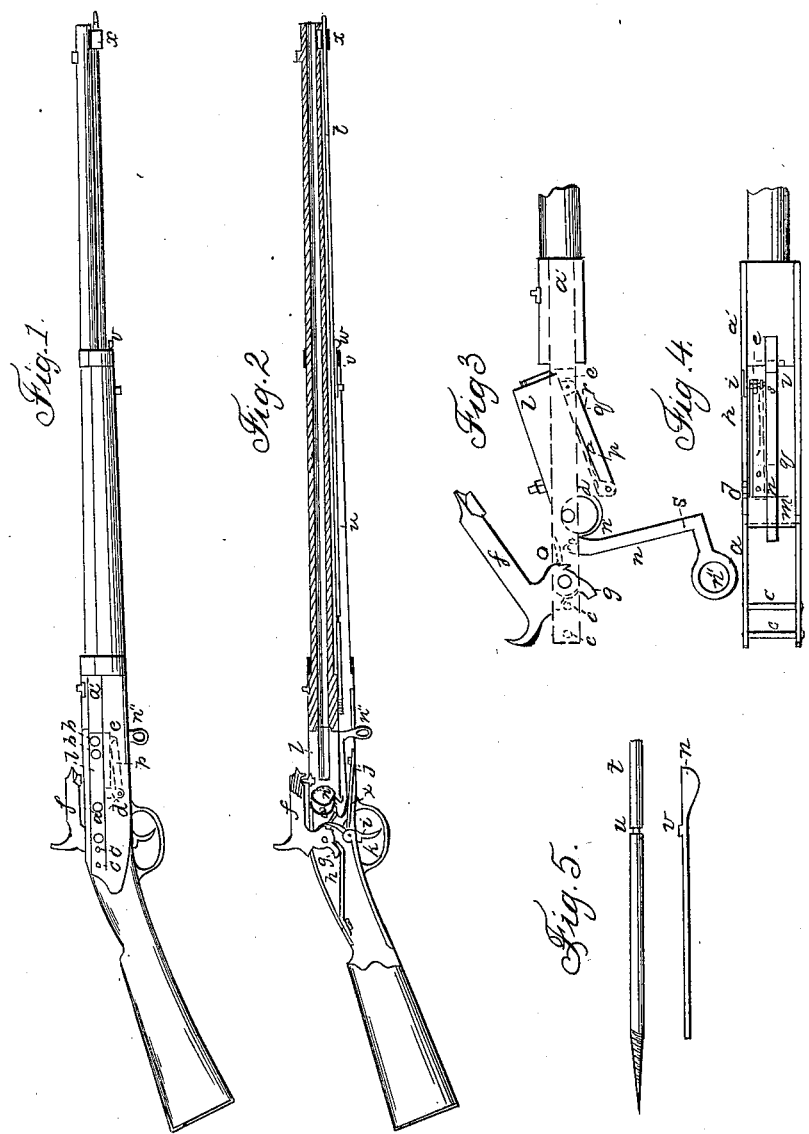

UNITED STATES PATENT OFFICE.

NATHAN STARR, OF MIDDLETOWN, CONNECTICUT.

IMPROVEMENT IN FIRE-ARMS.

Specification forming part of Letters Patent No. 1,141, dated May 3, 1839.

*To all whom it may concern:*

Be it known that I, NATHAN STARR, of Middletown, in the county of Middlesex and State of Connecticut, have invented a new and useful Improvement in Fire-Arms; and I do hereby declare the following to be a full and exact description thereof, reference being had to the drawings accompanying and making part of this specification, and the same parts are designated by the same letters of reference in all the different figures.

Figure 1 of the drawings represents a side view of the gun; Fig. 2, a longitudinal section through it. Fig. 3 shows the internal arrangement of the lock-chamber, &c. Fig. 4 shows the spring for confining the handle or arm of the eccentric, and Fig. 5 exhibits the groove in the ramrod and the projection on the spring for confining the ramrod when used as a bayonet.

The nature of my invention consists in so constructing a gun, which shall load at the breech, by inserting a certain portion of the barrel of the chamber within the other, as that it cannot be discharged without said portion being first inserted, thereby preventing the danger of undue explosion now existing in guns of such description.

$a$ and $a'$, Figs. 1, 3, and 4, represent two plates attached to each other by screws at $b$, Figs. 1 and 4, which are secured to the breech of the barrel and extend back beyond the hammer. On the opposite side of the barrel is another plate, in length equal to both $a$ and $a'$, and connected to them by screws $c\ c$, Figs. 1, 3, and 4. These plates form the bearings of the pivots of the tumbler or hammer and eccentric, and serve to keep the chamber in its true position. On the under side of the plate $a$, projecting downward, is a stud, $d$, Figs. 1 and 3, with an arm, $p$, Figs. 1, 3, and 4, extending from its lower extremity to the front end of the chamber, where it is attached by a joint, $e$, Figs. 1, 3, and 5.

$f$, Figs. 1, 2, and 3, represents the hammer, the lower part of which forms the tumbler, at the bottom of which a projection, $g$, Figs. 2 and 3, extends back, upon which the mainspring $h$, Fig. 2, acts in an upward direction and a protector forward, which will be hereinafter described.

$i$, Fig. 2, represents the trigger and dog united, and connected to the guard-plate by a pivot in the usual manner, the dog being kept in contact with the tumbler by the upward action of a spring, $j$, Fig. 2, on a projection, $k$, extending forward from the trigger near the pivot inside. This spring is also secured to the inside of the guard-plate.

$l$, Figs. 1, 2, 3, and 4, is the movable chamber with a small projection on its front end a little larger than the caliber of the common chamber, which is inserted into the breech of the barrel in the ordinary manner of guns of this description. Transversely at the back end of the movable chamber an eccentric, $m$, Figs. 2, 3, and 4, is inserted, and its outer ends are even with the sides of the chamber, and the pivots or bearings on which it turns are placed even with the back edge or the shortest radiating point of the eccentric. To the periphery of the eccentric a short arm, $n'$, is attached and projects downward and back on a radiating line from the center of the eccentric circle a sufficient distance to bring the long arm $n$ beneath the chamber, and connects with this short arm $n'$, as shown at Fig. 2, and this long arm $n$ is about the same length as the chamber, and the upper edge at the forward end is brought in contact with the chamber when in a true position for the piece to be discharged, as at Figs. 2 and 4. At the forward end another turn is given to this arm or handle at nearly a right angle in a downward direction, of sufficient length to bring the circular ring or handle $n''$, Figs. 1 and 2, beneath the stock. To this ring the hand is applied for giving motion to the eccentric $m$ and movable chamber $l$ in the operation of loading. The arm $n$, Figs. 2 and 3, has another projection, $z$, extending back of the short arm $n'$, and slopes downward in a circular form. The projection $z$ and the protector $o$, Figs. 2 and 3, are so adjusted that when the arm or handle $n$ is in its upper position, and the chamber in a true position to discharge, the hammer will come up on the cap and discharge the piece without the protector $o$ coming in contact with the short projection $z$, Fig. 2, of the arm $n'$; but if the arm $n$ is below its proper position, and consequently the chamber not properly inserted in the barrel, the projection $z$ being raised in attempting to discharge the piece, the protector $o$ will come in contact with the projection $z$ and arrest the progress of the hammer before it comes in contact with the cap, and prevent the discharge, or it will force the handle $n$ and chamber $l$ into their proper places before the discharge ensues, as shown at Fig. 3. The bearings or pivots of the eccentric are on a line with the center of the caliber, and the longest radiating point of the eccentric from the axis of rotation being in front and on a line with the center of the caliber when the eccentric and chamber are in a correct position for the piece to be discharged, consequently the reaction produced by the explosion within the chamber is directly back upon the eccentric on a line with the longest radiating point from the axis of rotation and its bearings, thereby removing the tendency to move the eccentric in a circular manner. A mortise or slot is formed in that part of the chamber equidistant between the sides, which lies back and partly beneath the eccentric, to allow the handle or arm $n'$ to connect with and give motion to the eccentric. In bringing the handle of the eccentric down, it gives the back end of the chamber a downward and backward movement, as shown at Fig. 3, while the arm $p$, in preventing the front end from moving directly backward, gives it an oblique upward movement sufficient to receive the charge. On the opposite side of the arm $p$ and connected to the under side of the chamber there is a spring, (represented by the red lines, Fig. 3,) with a point, $r$, projecting laterally from the outer end, which, when the handle is brought up, and consequently the chamber inserted, inserts into an aperture, $s$, in the handle, and thus secures both handle and chamber in their true position.

The ramrod $t$, Figs. 1, 2, and 5, is made in the form of those in common use, with the exception of the outer end being pointed, the object of which is that it may with ease be made to perform the duties of a bayonet, to effect which a groove, $u$, Figs. 2 and 5, is made near that end of it which inserts in the stock. When the rod is withdrawn, so that a sufficient portion of its length is beyond the muzzle of the piece to form the length of a bayonet, the groove $u$ is filled on one side by a projection, $v$, Figs. 2 and 5, on the spring $w$, Figs. 1, 2, and 5, which holds it firmly in its place, the outer end being guided by a clasp, $x$, in the usual manner, the whole of the foregoing to apply to one or more barrels combined together.

What I claim as my invention, and desire to secure by Letters Patent, is—

1. The before-described combination and arrangement of the arm $p$, stud $d$, and eccentric $m$, with the chamber $l$, for the purpose and in the manner described, and the projection $z$ of the arm $n$ of the eccentric $m$, in combination with the protector $o$ of the hammer $f$, for the purpose and in the manner described.

2. Converting the ramrod $t$ into a bayonet, substantially as above described and set forth.

N. STARR.

Witnesses:
   CLARK ELLIOTT,
   PHINEHAS RAINEY.